(No Model.) 2 Sheets—Sheet 1.
T. H. HESTER.
SEED PLANTER.
No. 423,251. Patented Mar. 11, 1890.
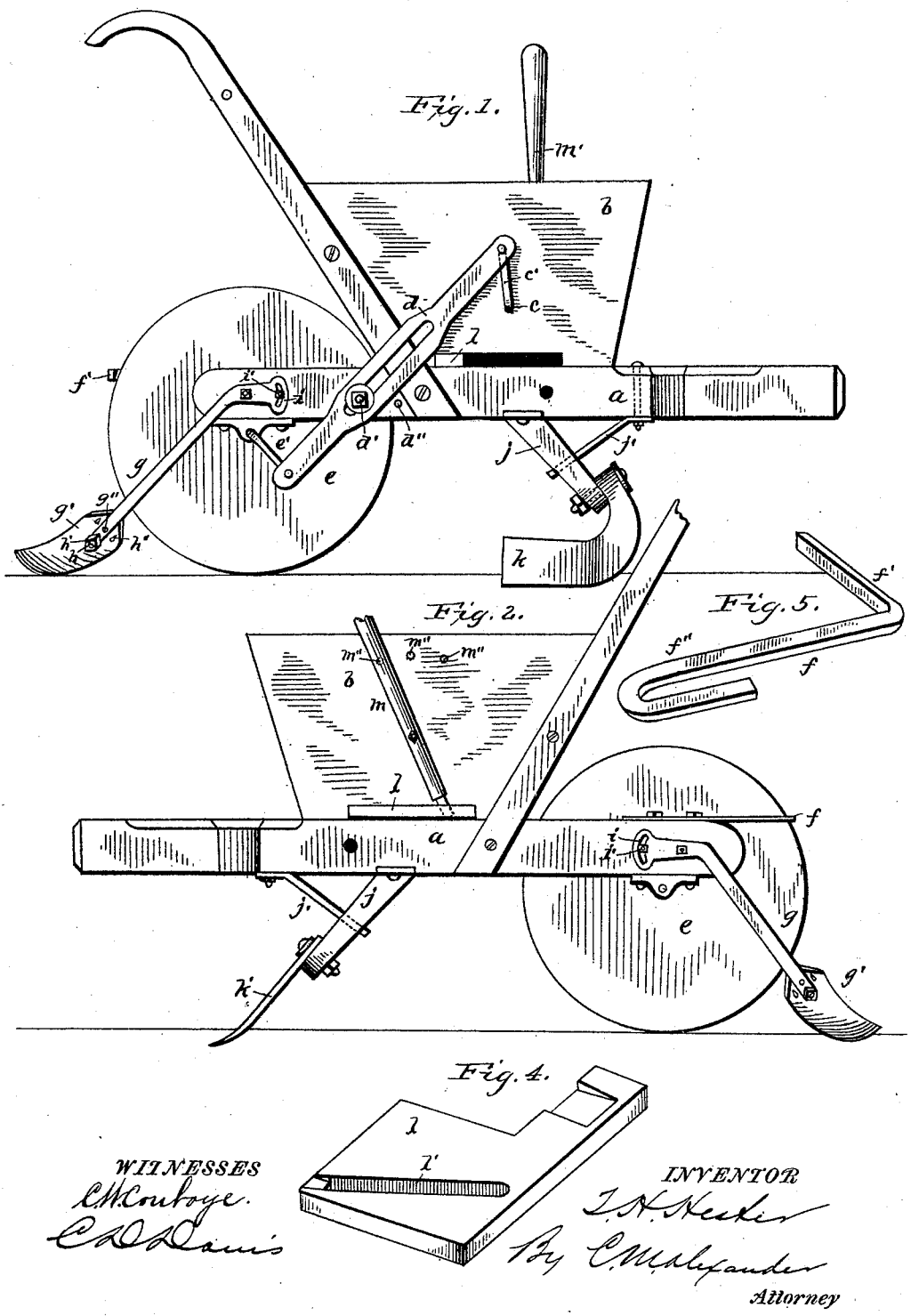
WITNESSES
INVENTOR

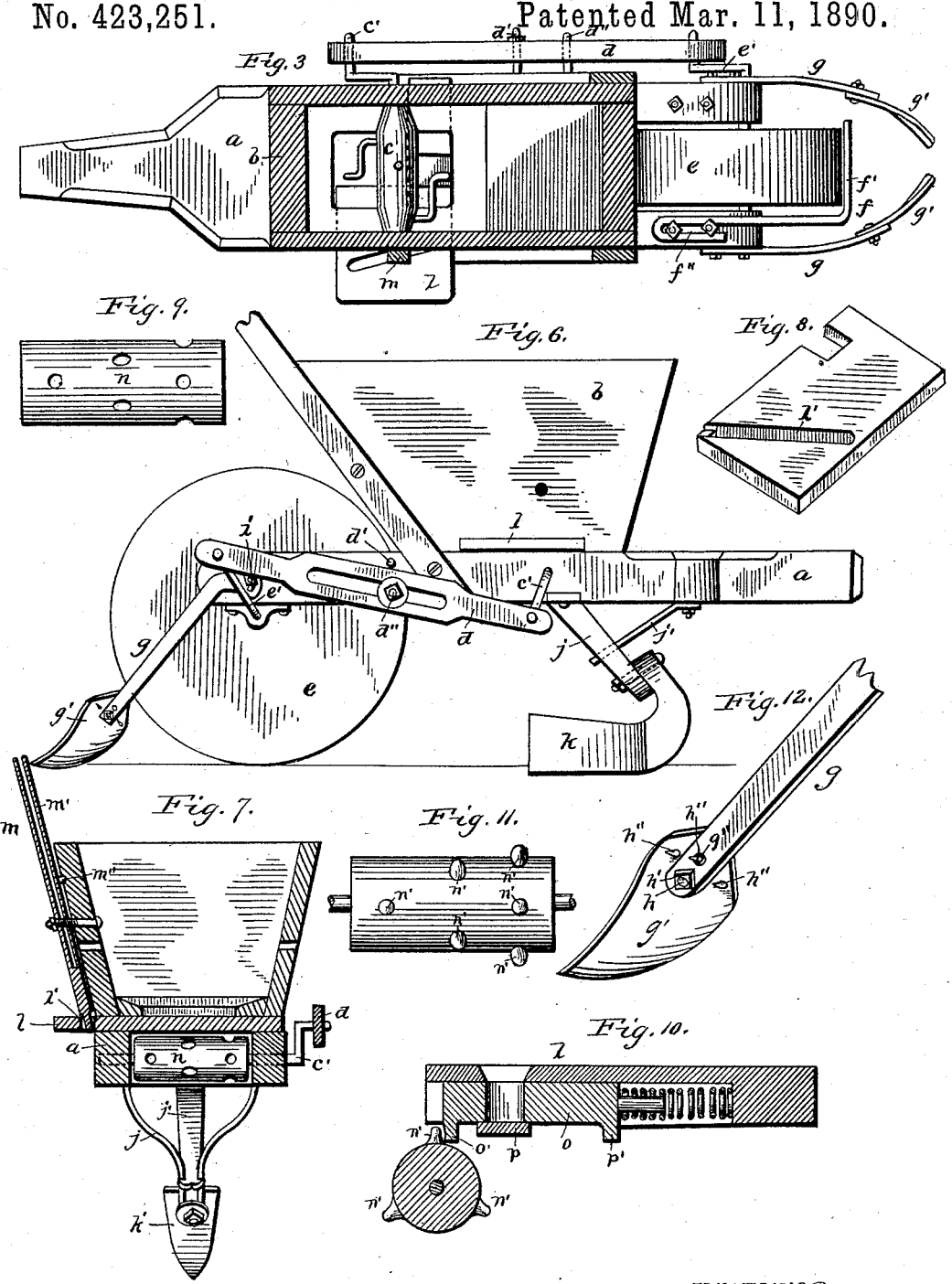

UNITED STATES PATENT OFFICE.

THOMAS H. HESTER, OF TROY, MISSISSIPPI.

SEED-PLANTER.

SPECIFICATION forming part of Letters Patent No. 423,251, dated March 11, 1890.

Application filed November 25, 1889. Serial No. 331,497. (No model.)

*To all whom it may concern:*

Be it known that I, THOMAS H. HESTER, a citizen of the United States, residing at Troy, in the county of Pontotoc and State of Mississippi, have invented certain new and useful Improvements in Seed-Planters, of which the following is a specification, reference being had therein to the accompanying drawings, in which—

Figures 1 and 2 represent views of opposite sides of the planter adjusted to plant cotton-seed; Fig. 3, a plan view of the same, a portion of the hopper being in section; Fig. 4, a detail perspective view of the seed-slide used in planting cotton; Fig. 5, a perspective view of the wheel scraper or cleaner; Fig. 6, a side elevation of the machine arranged to plant corn; Fig. 7, a sectional view of the same; Figs. 8 and 9, detail perspective views of the slide and roller employed in planting corn; Figs. 10 and 11, detail views of the slide and knobbed roller employed in planting peas, and Fig. 12 a detail view of one of the covered blades.

The invention has for its object the production of a simple and practical planter that may be readily adjusted to plant various kinds of seeds, such as cotton, corn, and peas; and it consists in certain novel features of construction that will be fully hereinafter described, and pointed out in the claim appended.

In the drawings annexed, $a$ designates the frame of the machine, which consists, essentially, of two separated beams of equal length. Upon the forward part of the frame is secured the hopper $b$, provided with an open button. Journaled in the hopper near its bottom is a transverse spiked roller $c$, the shaft of which extends out on one side and is formed into a crank $c'$. This spiked shaft has motion imparted to it by means of a pitman-rod $d$, which connects the crank $c'$ to a crank $e'$, formed on the shaft of a packing-roller $e$, journaled between the beams of the frame to the rear of the hopper, this packing-roller being arranged in line with the seed-opening in the hopper.

To guide the pitman in its reciprocatory movements, I provide the same with a longitudinal slot, and pass through this slot a stationary pin or bolt $d'$, and screw or otherwise secure the same in the frame of the machine and provide it with a removable nut and washer to prevent displacement.

To keep the periphery of the packing-wheel clear of soil, I secure upon one side of the frame a scraper $f$, which is constructed, preferably, of a bar of metal bent to form a scraping-arm $f'$, (which is at right angles to the main portion of the bar and extends across the periphery of the wheel,) and a slotted portion $f''$, whereby it may be adjustably secured to the frame to compensate for wear and other purposes.

The coverer-arms $g$ are pivotally secured upon opposite sides of the rear end of the frame and are provided with inclined adjustable blades $g'$, which are constructed as shown in Fig. 1. These coverer-blades are pivotally secured to the arms by means of pivotal bolts $h$, provided with clamping-nuts $h'$ on the outside faces of the arms. To hold these blades in any of their adjusted positions, I provide each of them on its outside with a series of pins or lugs $h''$, which fit in a recess or aperture $g''$ in the arm $g$, and thus prevent the blades slipping. By this means the covering-blades may be adjusted to throw more or less soil upon the deposited seed, as the exigencies of the case may require.

To adjust the arms $g$, I provide them with forward slotted extensions $i$, and pass through the vertical slots in these extensions clamping-bolts $i'$, which serve to hold the coverer-arms in their adjusted positions.

A forwardly-inclined standard $j$ is bolted to the under side of the frame and braced by a bar $j'$. This bar or rod $j'$ may be provided at its rear end with notches for the reception of the side pieces of the standard, the latter being formed either of a single bar of metal bent double or cast in one piece, as may be desired. Pivotally and adjustably secured to the lower end of this standard is a furrow-opening shoe $k$. As shown in Fig. 2, in lieu of this shoe I may employ a single blade $k'$, which will answer as well in some soils.

Under the hopper and extending across its bottom is arranged an adjustable seed-slide $l$, (shown in detail in Fig. 4,) which is cut away at its forward edge to permit the passage of the cotton-seed from the hopper. This slide is provided at its outer end with an inclined slot $l'$, in which the lower end of a lever $m$ works, this lever being pivoted on the side of the hopper and split longitudinally at its upper end to form a spring portion $m'$, which is provided with a beveled lug on its inner face adapted to rest in recesses $m''$ in the side of the hopper. By moving the lever in a forward direction the slide is drawn out and the seed-passage made larger, and by moving it rearwardly the slide is forced in and the capacity of the seed-passage decreased, as is evident, the slide being held in any of its adjusted positions by means of the spring-arms $m'$ and the recesses $m''$. Thus it will be seen that the operator may adjust and regulate the quantity of seed being planted without leaving his place or stopping his horse.

The machine as above described is adapted particularly for planting cotton-seed, and operates as follows: As the machine moves forward the shoe or blade forms the furrow, and the spiked shaft agitates and forces out the cotton-seed, (the amount being regulated by the seed-slide,) which drops into the furrow. The packing-wheel then packs or presses the seed into the earth and finally the covering-blades throw a suitable quantity of loose soil upon the seed, the whole operation being entirely automatic.

To adjust the machine for corn-planting the spiked stirrer and cotton-seed slide are removed and the slide and roller shown in Figs. 6 to 9, inclusive, substituted therefor. The corn-slide is put in in the same manner as the cotton-slide, but is provided with a smaller beveled aperture, as shown. The roller $n$ is journaled between the frame-beams below the opening in the seed-slide, and is provided with recesses or pockets for the seed in its periphery. The shaft of the cotton-seed stirrer is also used to operate and support this roller, the pitman being lowered a little to connect with the crank-arm in its new position. A supplemental guiding bolt or pin $d''$ is secured in the frame below the bolt $d'$ to serve as a guide to the pitman when the same is adjusted for planting corn or peas. As shown, this roller $n$ is provided with three series of seed-pockets in its periphery, each of which has a different number of pockets. Any one of these series may be made to register with the aperture in the seed-slide by adjusting the latter, whereby the proximity of the "hills" of corn may be regulated, as is evident. In operation the corn falls through the opening in the seed-slide, and as the roller is rotated it is deposited in the furrow formed by the shoe or opening-blade.

The pea-planting devices are constructed quite similarly to the corn-planting devices. The essential difference is that in lieu of the three series of apertures or recesses in the roller I employ three or more series of knobs or projections $n'$, which, when the roller is rotated, come in contact with a downwardly-projecting lug $o'$ on a spring-actuated slide $o$, recessed in the bottom of the seed-slide and attached thereto by a plate $p$. The slide $o$ has an opening in it which normally registers with the opening in the slide proper, and which is normally closed by the said plate $p$, which holds it in place. A projection $p'$ on this slide $o$ prevents the spring that actuates it from pressing it too far forward. It will be observed that as the roller rotates the knobs $n'$ (of whichever series to which the slide is adjusted) will successively come in contact with the projection $o'$ on the slide $o$ and force the latter backward a sufficient distance to permit the peas accumulated in the opening therein to fall over the rear edge of the securing-bar $p$, and when the knobs pass the projection on the slide the latter will automatically resume its normal position and permit its opening to fill again with peas.

To enable the adjusting-lever $m$ to be moved to one side out of engagement with the slot in the seed-slide, I connect one end of the inclined slot $l'$ with the edge of the seed-slide by means of a groove or notch, which permits the lower end of the lever to pass out of the notch when the upper end of the lever is thrown back the requisite distance.

Having thus fully described my invention, what I claim, and desire to secure by Letters Patent is—

The combination of a frame provided with handles, a hopper mounted on the frame, an opener secured to the frame in front of the hopper, a packing-wheel journaled on the frame in rear of the hopper, adjustable covering-blades behind the packing-wheel, a slide in the bottom of the hopper provided with a seed-aperture and a diagonal slot $l'$ at one end, an operating-lever $m$ pivoted on the side of the hopper and engaging the slot $l'$ in the slide, and a spring $m'$, secured to the said lever $m$ and provided with a lug to enter depressions $m''$ in the adjacent sides of the hopper, substantially as described.

In testimony whereof I affix my signature in presence of two witnesses.

THOMAS H. HESTER.

Witnesses:
R. J. HESTER,
J. V. HESTER.